July 23, 1940.  C. McCURLEY ET AL  2,208,593
TIRE COVER
Filed Sept. 17, 1931  3 Sheets-Sheet 1
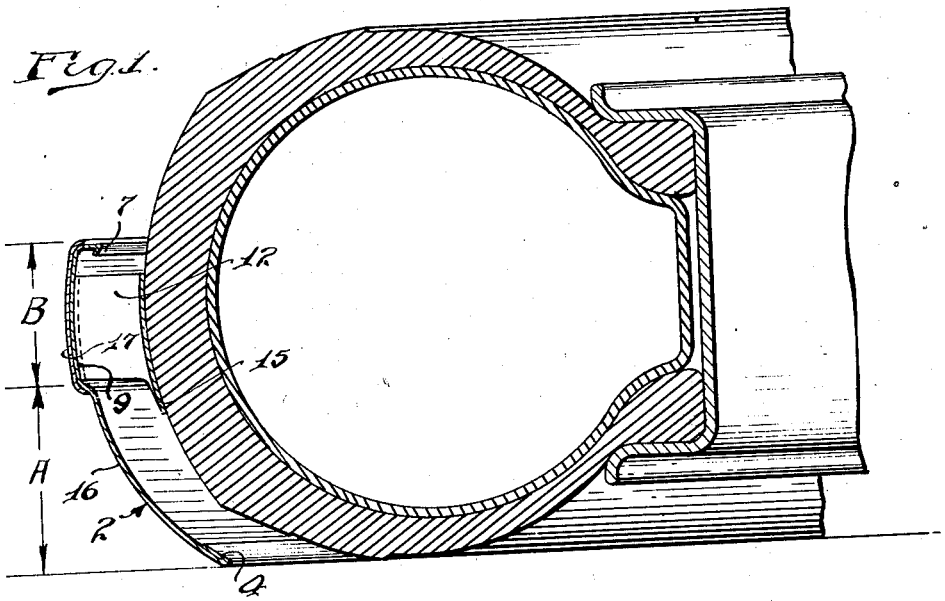
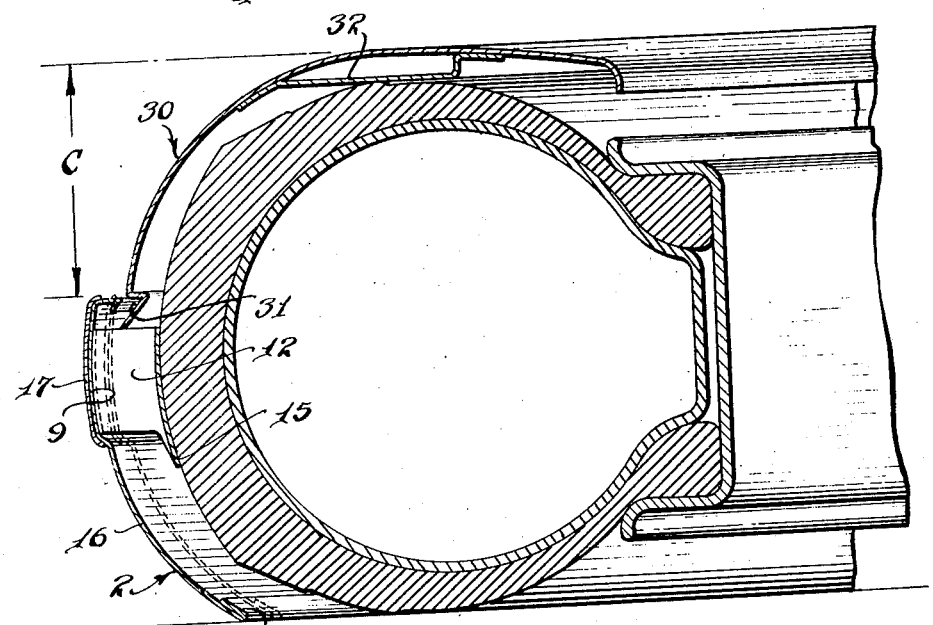
INVENTOR.
CHARLES McCURLEY.
RUSSELL E. HANSEN.
BY Barnes & Kisselle
ATTORNEYS July 23, 1940.  C. McCURLEY ET AL  2,208,593
TIRE COVER
Filed Sept. 17, 1931   3 Sheets-Sheet 2
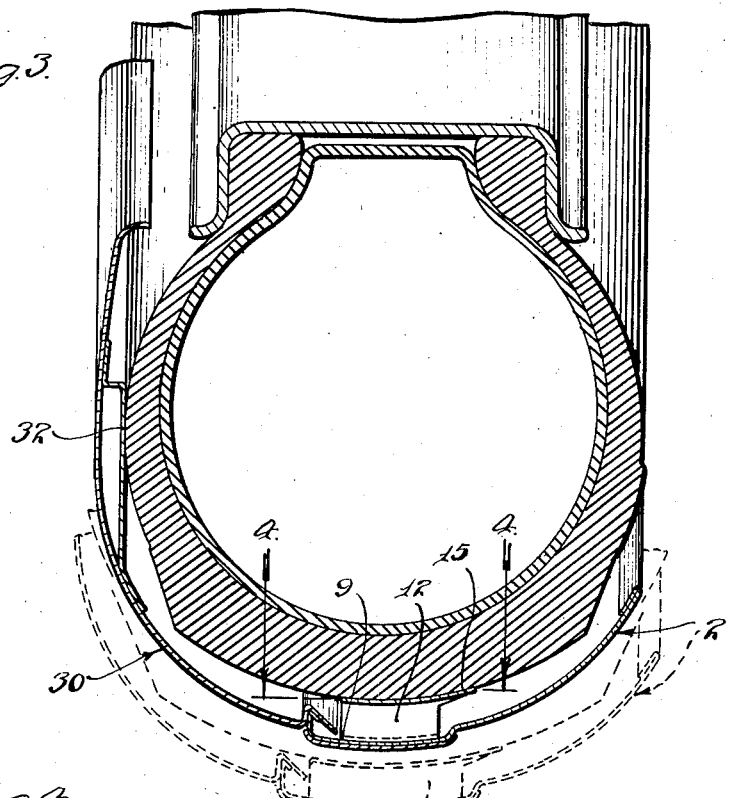
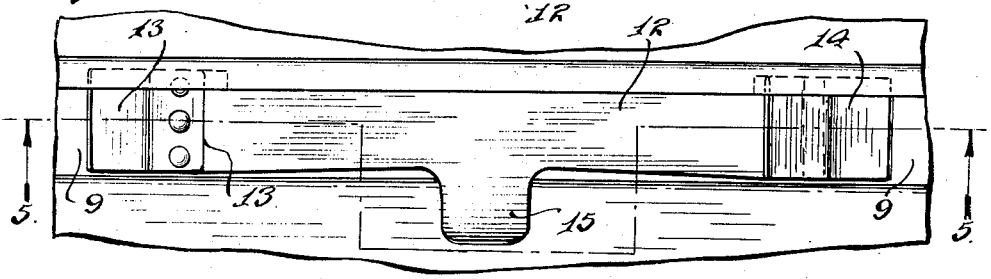
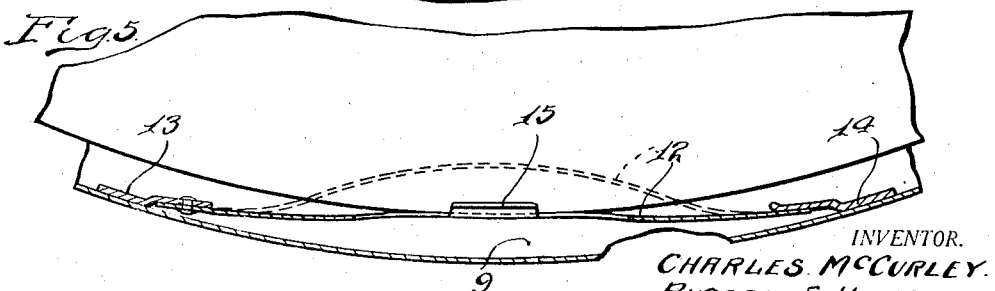
INVENTOR.
CHARLES McCURLEY.
BY RUSSELL E. HANSEN.
Barnes & Kissell
ATTORNEYS July 23, 1940.  C. McCURLEY ET AL  2,208,593
TIRE COVER
Filed Sept. 17, 1931  3 Sheets-Sheet 3
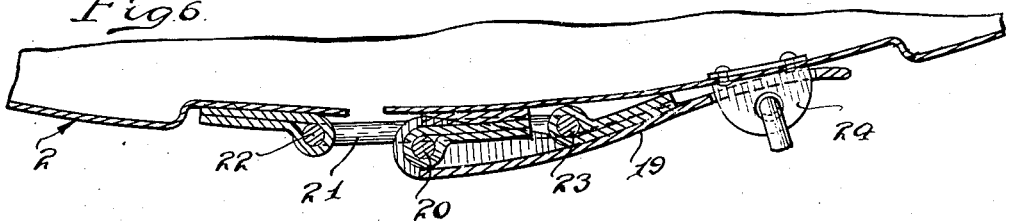
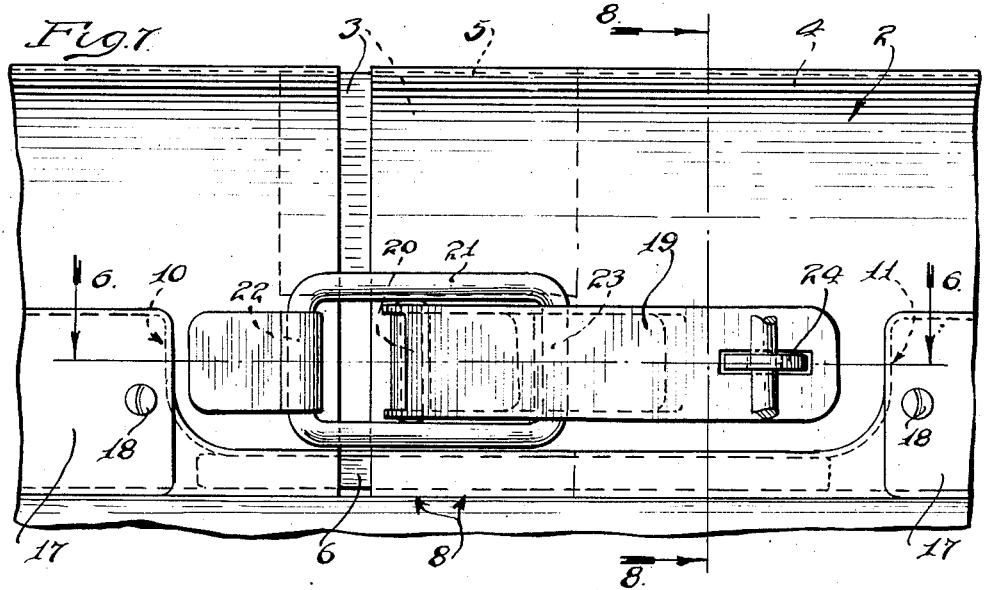
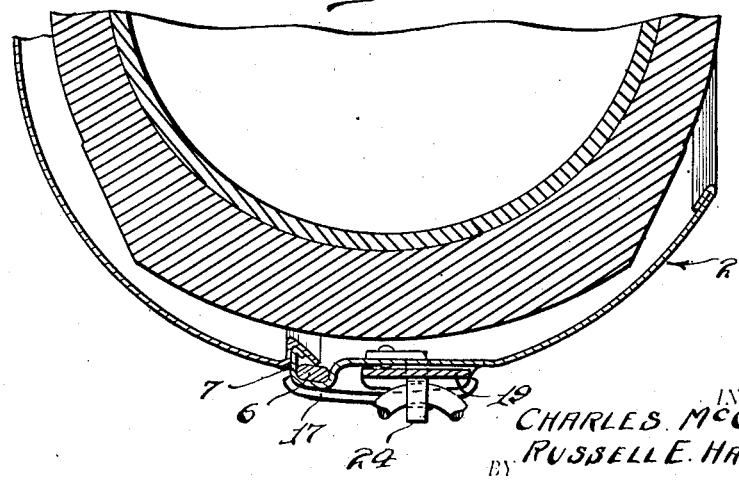
INVENTOR.
CHARLES McCURLEY.
RUSSELL E. HANSEN.
BY Barnes & Kisselle
ATTORNEYS

Patented July 23, 1940

2,208,593

UNITED STATES PATENT OFFICE 2,208,593

TIRE COVER

Charles McCurley, Detroit, and Russell E. Hansen, Grosse Pointe, Mich., assignors to Clayton & Lambert Manufacturing Company, Detroit, Mich., a corporation of Delaware Application September 17, 1931, Serial No. 563,366

7 Claims. (Cl. 150—54)

This invention relates to a tire cover, and more particularly to metal tire covers of the type adapted to conform to the contour of and cover the face and periphery of the tire.

Most recent developments in metal tire covers have embodied the idea of utilizing an annular one piece part for covering the face and a portion of the periphery of the tire, and different means have been utilized for clamping or positioning the tire within this face member. Some covers have utilized fabric secured to the face member and carrying a coil spring for causing the fabric to contract around the periphery and rear of the tire. Another cover has utilized a separate and inherently resilient split band for engaging the periphery of the tire and a portion of the face member. Still others have embodied different forms of devices carried by the face member and adapted to clamp the periphery or rear of the tire in some manner.

It is the object of the present invention to provide a metal tire cover in two parts; namely, a front cover and a back cover, but the tire, instead of being clamped and held between the front cover as one surface and some kind of a contracting member as the other surface, is adapted to be held or clamped entirely by the back member; in other words, the front member of the present cover has no clamping function in the assembly of the cover around the tire.

More specifically, the present invention embodies a back cover member which is split and having means for contracting and expanding the same; this back member extends from a point near the center of the periphery of the tire to a point along the side wall and carries a plurality of fixed resilient clamping members with the result that the back cover member may be placed on the ground in expanded position, the tire dropped or thrown into this cover and the cover member contracted so that the resilient clamping members contact with the periphery of the tire closely adjacent the apex thereof. The front cover member is held in position by the contracting of the back cover member.

Another feature of the present invention resides in the provision of a front cover member whose depth is maintained constant regardless of the size and type of cover, and a back cover member having an outer rim maintained at a constant depth and an inner portion whose width will vary proportionately with the size of the tire to be covered. The result of this arrangement is that the inner rim of the back cover which is in the form of an ornamental bead, varies in width with the size of the tire whereby this bead always remains exactly in alignment with the plane through the center of the tire.

A still further feature of the present invention contemplates the locating of the front cover by the clamping springs carried by the back cover so that the front cover member is automatically centered and clamped in position by the contracting of the back cover member.

Other features reside in the structure and positioning of the clamping springs to accommodate different sizes of tires or the same tire as it is worn; in the arrangement of the front and back covers relative to the tire so that the tire cover is always completely separated from the surface of the tire and also ventilated therefrom; and other features of structure and arrangement as will be more clearly brought out in the specification and claims.

In the drawings:

Fig. 1 is a sectional view taken through a standard tire and showing the manner of positioning the same within our novel back cover member.

Fig. 2 is a sectional view similar to Fig. 1 but illustrating the front cover member lowered into position and also illustrating the back cover member in expanded position in solid lines and in contracted position in dotted lines.

Fig. 3 is a sectional view illustrating the manner of keeping the bead of the back cover member at the exact center of the periphery of the tire, one size tire being shown in solid lines and a larger size tire and cover being shown in dotted lines.

Fig. 4 is a fragmentary view of the inside of the tire cover as taken along the lines indicated as at 4—4 in Fig. 3.

Fig. 5 is a fragmentary sectional view taken on line 5—5 of Fig. 4.

Fig. 6 is a fragmentary sectional view taken on line 6—6 of Fig. 7 and illustrating in detail the preferred arrangement of the means for expanding and contracting the back tire cover.

Fig. 7 is a plan view of that section of the tire cover shown in Fig. 6 and illustrating particularly the lever mechanism, the manner of securing the ornamental bead in position, and the relative slidability between the ends of the back cover member.

Fig. 8 is a sectional view taken on line 8—8 of Fig. 7.

The preferred cross sectional contour of the back cover member which may be generally designated 2, is illustrated in Fig. 1. This back cover member is annular in shape and is split as best shown in Fig. 7. One end of the back cover member is provided with a flat plate 3 which may be formed as a part of or welded to the cover member. This plate or extension 3 is preferably arcuate in cross section.

The cover member 2 is provided with the turned over bead 4 and this bead is slightly spread at a point 5 to receive an edge of the extension plate 3. The opposite side of the end of the cover member 2 which carries the plate member 3, also carries a relatively small guide or finger 6. The top periphery of the cover member 2 is provided with a turned over flange 7 and this flange is turned over for a portion of its length as at the points 8 so as to receive and guide the finger 6 with the result that the back cover member may be expanded and contracted the length of the extension plate 3 or from two to three inches.

The back cover member is embossed as at 9 to provide a bead which extends substantially completely around the back cover member, terminating at the points 10 and 11, as shown in Fig. 7. Spaced around the inner surface of this bead and fixedly secured to the wall thereof is a plurality of spring clamping members 12. As best shown in Figs. 4 and 5, one end of each spring member is preferably riveted to a member 13 which may be welded to the wall of the bead 9, the other end being slidably retained by a somewhat similar member 14. This arrangement permits each spring member to assume different positions, as best shown in Fig. 5, whereby to accommodate the cover to different sizes of tires or to the same tire after it has worn considerably.

The flexibility and arrangement of the spring members 12 also provides a positive tensioning and flexing thereof by the tire upon the contraction of the back cover member. In assembly it is not necessary that the tire even touch the spring members when they are in the position shown in dotted lines in Fig. 5, but when the back cover member is contracted to the closed position, as shown in Fig. 7, it will be obvious that the spring members 12 will also be drawn towards the axis of the cover with the result that they will clamp the tire in place with more or less pressure. The central bottom portion of each spring member 12 is provided with an inwardly curved projection 15 which not only strengthens the spring at this point, but assists in locating the tire relative to the back cover member, particularly if one should try and assemble the tire cover in position without first placing the back cover member flat on the ground.

Referring particularly to Fig. 1, the depth of the arcuate portion 16 of the back cover member is constant for all sizes of covers, but the width B of the bead 9 will vary in accordance with the size of the tire; small tires having a relatively narrow bead and large tires having a relatively broad bead. An ornamental bead 17 preferably of chromium plated material may be secured to the cover as by means of the screws 18 as best shown in Fig. 7. When the ornamental bead 17 is of a different color than the general surface of the tire cover, the width and position of the bead is a very important factor from an ornamental standpoint.

With the depth A of the arcuate portion 16 of the back cover member fixed, and the width B varying according to the size of the tire, it will be seen that the center portion of the bead 9 will always be positioned exactly at the center of the periphery of the tire so that in assembling the cover upon the tire, all that is necessary is to lay the back cover member flat on the ground and lower the tire within the cover so that the side wall of the tire also is supported by the ground. If the tire is slightly oversize, the spring members 12 may be slightly compressed, but at any rate, with the correct width of the bead 9, it will be seen that if both the cover member and the tire contact with the ground that the bead will always be correctly positioned relative to the periphery of the tire. Now, as the back cover member is contracted it will be seen that the spring member 12 will be compressed, as shown in Figs. 2 and 5 to securely clamp the tire in position. In Fig. 2 the expanded position of the cover member 2 is shown in solid lines and the contracted position in dotted lines. The width of the spring 12 may vary with the change in width of the bead 9, as best illustrated in Fig. 3.

The expanding and contracting action of the back cover member is by means of a lever handle 19 which is pivoted close to one end of the cover member as at 20, and a connecting yoke member 21 which is pivoted to the other end of the cover member 2 as at 22 and to the lever member 19 as at 23. A suitable lock hasp 24 may be riveted to the cover, as shown in Figs. 6 and 7, so that the tire cover may be securely locked in place with the result that even though the tire should be stolen the tire cover would have to be cut away to obtain access to the tire.

The back cover member 2 may be formed on rolls with the result that the different sizes of back cover members may be formed on the same set of rolls, but the front cover member which may be generally designated 30, is preferably formed of a single continuous piece. This annular front cover member covers the entire front of the tire and terminates at its inner periphery in a specially shaped flange 31. The depth C of the cover 30 is constant for all sizes and this is made possible because of the varying width of the bead 9. As the front cover member 30 is assembled from the top, it will be seen that the surface thereof will be prevented from being marred or scratched during the assembly of the tire cover around the tire.

The front cover 30 is provided with a plurality of insulating or ventilating strips 32 which are secured to and spaced around the inner wall of the cover. It is not necessary that these strips 32 contact with the side wall of the tire, but if they do contact with the side walls they serve as means for preventing any sticking of the tire to the tire cover. By holding the tire cover in place by means of the springs 12 and by always spacing the side wall of the tire from the front cover by the members 32 it will be seen that we have provided complete ventilation entirely around the tire, making it impossible for any part of the tire to stick to the tire cover.

In the assembly of the complete unit, the cover member 2 is first placed upon the ground or floor and the tire lowered therein as shown in Fig. 1. The front cover member 30 is then lowered into position so that the flange 31 contacts with the upper edges of the spring members 12 whereby the front cover member is automatically and positively located. The operator can now completely forget the two cover members and merely grasp the opened lever 19 and in closing the same gradually contract the outer member 2 so that the flange 7 cooperates with and fits within the flange 31 of the front cover member and at the same time move the springs 12 inwardly to resiliently but positively clamp the tire at spaced points around the periphery thereof.

Some tires are considerably wider than others and in such case it is only necessary to raise the back cover 2 slightly until the spring members contact with the periphery or raise the cover member and slightly move the lever 19 to contract the rim sufficiently so that the back cover member will remain in place. The front cover member 30 may then be positioned in place and the back cover member completely contracted.

What we claim is:

1. A tire cover comprising a continuous one-piece front cover member and a split one-piece back cover member, means for expanding and contracting the back cover member, clamping means carried by the back cover member for receiving and positioning a tire when the cover is expanded and for positively engaging the tire at the periphery thereof when the back cover member is contracted, said clamping means being so positioned as to locate the front cover in clamping position relative to said back cover.

2. A tire cover comprising a continuous one-piece front cover member and a split back cover member, means for contracting the back cover member, clamping means carried by the back cover member for receiving and positioning a tire and for positively engaging the tire when the back cover member is contracted, said front and back cover members having interfitting inner edges, whereby the front cover may be positioned in telescoping relation to and then clamped into position by the contracting of said back cover member, both of said cover members being spaced from the tire, and said clamping means being arranged to locate said front cover preparatory to being clamped by said back member and to provide ventilation around the tread of the tire.

3. A tire cover comprising a circular one piece front cover member terminating adjacent the median plane of the tire, a split back cover member also terminating adjacent the median plane of the tire, means for expanding and contracting the back cover member, the inner edges of said two cover members being fabricated so as to interfit when the back cover member is contracted, relatively long and narrow spring members carried by and circumferentially positioned and spaced around the inside of the back cover member, said spring members being so positioned as to prelocate the inner edge of the front cover member and to contact with the tread of the tire and serving to clamp the tire in position when the back cover member is contracted, the cross sectional contour of the contacting part of the spring approximating the transverse contour of the tread of the tire.

4. A tire cover comprising a front cover member and a back cover member, one of said members being split, means for expanding and contracting said split member substantially within its own plane, means carried by the split member for engaging and positioning the tire and the inner edge of the other member when said member is expanded and for securely clamping said cover in position when said split member is contracted.

5. A tire cover comprising a rigid front cover member and a split back cover member, means for expanding and contracting the back cover member in its own plane, clamping means normally opposing the contracting of the back cover member and circumferentially spaced around and carried by said back cover member for receiving a tire, said clamping means being positioned to contact and receive the tire and the inner edge of the front cover member when the back cover member is expanded, said clamping means being positively displaced by the tire when the back cover member is contracted, the inner edges of said back cover member and front cover member meeting adjacent the median plane of the tire, the inner edge of the front cover member fitting within the inner edge of the back cover member whereby the back cover member may be laid on the ground, expanded, the tire placed therein, the front cover member placed on the tire and the back cover member contracted within its own plane whereby to clamp said back cover member by said contracting action.

6. A tire cover, comprising a back cover member and a front cover member both annular in shape, clamping means caried by the back cover member and circumferentially spaced around the cover adjacent the inner edge thereof, means for contracting said back cover, the inner edges of said front and back cover members having an interfitting telescoping relation, whereby when the front cover member is moved axially relative to the back cover member the inner edge thereof will contact with and be positioned by said clamping means, the contracting of the back cover member causing the clamping means to move inwardly and positively engage the periphery of the tire, said contracting action being adapted when the front cover member is in interfitting relation with the back cover member to effect positive interlocking between the interfitting edges of the cover members to hold the front cover member in position.

7. A tire cover comprising a front cover member and a back cover member, one of said members being split, means for contracting said split member substantially within its own plane, and means carried by the split member tending to normally circumferentially expand the split cover when a tire is positioned therein, said last named means being so arranged and positioned within the split member as to engage and position the tire and the inner edge of the other member when said split member is expanded and securely clamping said cover in position when said split member is contracted.

CHARLES McCURLEY.
RUSSELL E. HANSEN.